(12) United States Patent
Yokoi

(10) Patent No.: US 10,403,132 B2
(45) Date of Patent: Sep. 3, 2019

(54) DRIVING ASSISTANCE DEVICE AND A DRIVING ASSISTANCE METHOD

(71) Applicant: TOYOTA JIDOSHA KABUSHIKI KAISHA, Toyota-shi, Aichi-ken (JP)

(72) Inventor: Yasunobu Yokoi, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/944,166

(22) Filed: Apr. 3, 2018

(65) Prior Publication Data

US 2018/0308351 A1   Oct. 25, 2018

(30) Foreign Application Priority Data

Apr. 20, 2017   (JP) .................. 2017-083977

(51) Int. Cl.
| | |
|---|---|
| *G08G 1/01* | (2006.01) |
| *G08G 1/052* | (2006.01) |
| *G08G 1/017* | (2006.01) |
| *B60Q 9/00* | (2006.01) |
| *G08G 1/16* | (2006.01) |
| *G08G 1/0962* | (2006.01) |
| *H04W 84/00* | (2009.01) |

(52) U.S. Cl.
CPC ........... *G08G 1/0141* (2013.01); *B60Q 9/008* (2013.01); *G08G 1/012* (2013.01); *G08G 1/017* (2013.01); *G08G 1/0112* (2013.01); *G08G 1/0133* (2013.01); *G08G 1/052* (2013.01); *G08G 1/0962* (2013.01); *G08G 1/162* (2013.01); *G08G 1/163* (2013.01); *G08G 1/166* (2013.01); *H04W 84/00* (2013.01)

(58) Field of Classification Search
CPC .... G08G 1/0141; G08G 1/0112; G08G 1/162; G08G 1/0133; G08G 1/017; G08G 1/052; G08G 1/012; B60Q 9/008
See application file for complete search history.

(56) References Cited

U.S. PATENT DOCUMENTS

2016/0260323 A1\* 9/2016 Blekken .................. G08G 1/056
2017/0206783 A1\* 7/2017 Miller ....................... G08G 1/08

FOREIGN PATENT DOCUMENTS

JP        2014-191577 A    10/2014

\* cited by examiner

*Primary Examiner* — Ryan W Sherwin
(74) *Attorney, Agent, or Firm* — Hunton Andrews Kurth LLP

(57) ABSTRACT

A driving assistance device that alerts about a state of surrounding vehicles based on other vehicle information, which is information on other vehicles, is provided. The device includes a reception unit that receives the other vehicle information, an identification unit that identifies that one of other vehicles is a disabled vehicle if it is determined, using each piece of the other vehicle information received from a plurality of other vehicles, that a state where a distance between the other vehicles is equal to or less than a predetermined distance has continued for a predetermined time or more, and a driving assistance change unit that, if it is determined that one of the other vehicles is a disabled vehicle, changes at least one of a driving assistance providing condition and a driving assistance providing method both of which are based on the other vehicle information received from the disabled vehicle.

4 Claims, 3 Drawing Sheets

DRIVING ASSISTANCE DEVICE AND A DRIVING ASSISTANCE METHOD

INCORPORATION BY REFERENCE

The disclosure of Japanese Patent Application No. 2017-083977 filed on Apr. 20, 2017 including the specification, drawings and abstract is incorporated herein by reference in its entirety.

BACKGROUND

1. Technical Field

The present disclosure relates to a driving assistance device and a driving assistance method.

2. Description of Related Art

Japanese Patent Application Publication No. 2014-191577 (JP 2014-191577 A) discloses a driving assistance device that assists the driving of a vehicle using vehicle-to-vehicle communication. This driving assistance device determines the possibility of collision between the host vehicle and other vehicles based on the traveling state of the host vehicle and the other vehicles in the vicinity of an intersection and, if there is a possibility of collision, alerts the driver of the host vehicle.

SUMMARY

When a driving assistance device is used to assist driving and, in this case, if there is another vehicle for which it is determined whether collision with the host vehicle will occur is a disabled vehicle, the alert mode is supposed to be changed. For example, a notification is output to notify that the other vehicle is a disabled vehicle. In that case, before changing the alert mode, it is necessary to determine whether the other vehicle is a disabled vehicle. One way to determine whether the other vehicle is a disabled vehicle is to use the disabled vehicle information sent from the disabled vehicle. However, the information sent from a disabled vehicle is generally less accurate and less reliable. Therefore, the disabled vehicle information sent from a disabled vehicle, if used to determine whether the vehicle is a disabled vehicle, decreases accuracy in determining whether the vehicle is a disabled vehicle, sometimes with the result that driving assistance does not work effectively.

In view of the foregoing, it is an object of the present disclosure to provide a driving assistance device and a driving assistance method that can improve accuracy in determining whether a vehicle is a disabled vehicle.

A driving assistance device according to one aspect of the present disclosure is a driving assistance device that alerts about a state of surrounding vehicles based on other vehicle information that is information on other vehicles. The driving assistance device includes a reception unit configured to receive the other vehicle information, an identification unit configured to identify that one of other vehicles is a disabled vehicle if it is determined, using each piece of the other vehicle information received from a plurality of other vehicles, that a state where a distance between the other vehicles is equal to or less than a predetermined distance has continued for a predetermined time or more, and a driving assistance change unit configured to, if it is determined that one of the other vehicles is a disabled vehicle, change at least one of a driving assistance providing condition and a driving assistance providing method both of which are based on the other vehicle information received from the disabled vehicle.

In the aspect described above, the identification unit may be configured to identify that one of the other vehicles is a disabled vehicle also if it is determined that a state where a speed difference between the other vehicles is equal to or less than a predetermined speed has continued for a predetermined time or more.

In the aspect described above, the identification unit may be configured to identify that one of the other vehicles is a disabled vehicle also if it is determined that information indicating that the one of the other vehicles is a disabled vehicle is included in the other vehicle information.

A driving assistance method according to another aspect of the present disclosure is a method controlled by a driving assistance device that alerts about a state of surrounding vehicles based on other vehicle information that is information on other vehicles. The driving assistance method includes receiving the other vehicle information, identifying that one of other vehicles is a disabled vehicle if it is determined, using each piece of the other vehicle information received from a plurality of other vehicles, that a state where a distance between the other vehicles is equal to or less than a predetermined distance has continued for a predetermined time or more, and if it is determined that one of the other vehicles is a disabled vehicle, changing at least one of a driving assistance providing condition and a driving assistance providing method both of which are based on the other vehicle information received from the disabled vehicle.

The present disclosure can provide a driving assistance device and a driving assistance method that can improve accuracy in determining whether a vehicle is a disabled vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
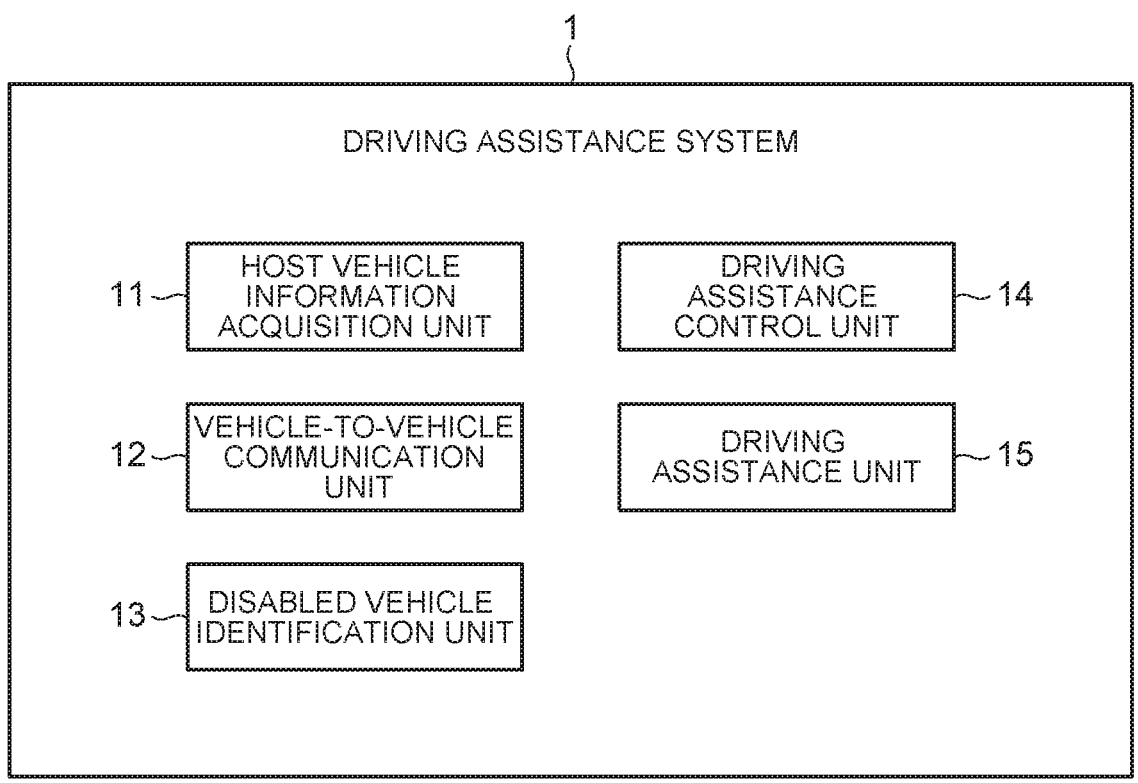
FIG. 1 is a diagram showing an example of a general configuration of a driving assistance system that includes a driving assistance device according to an embodiment.

A preferred embodiment of the present disclosure will be described in detail below with reference to the attached drawings. In the figures below, the components with the same reference numeral have the same or similar configuration.

With reference to FIG. 1, a configuration of a driving assistance system that includes a driving assistance device according to the embodiment will be described. A driving assistance system 1 includes, for example, a host vehicle information acquisition unit 11, a vehicle-to-vehicle communication unit 12, a disabled vehicle identification unit 13, a driving assistance control unit 14, and a driving assistance unit 15.

Out of these components of the driving assistance system 1, at least the vehicle-to-vehicle communication unit (reception unit) 12, disabled vehicle identification unit (identification unit) 13, and driving assistance control unit (driving assistance change unit) 14 are used to configure the driving assistance device according to the embodiment. The components of the driving assistance device are not limited to those components, and any other components can be added as necessary.

The host vehicle information acquisition unit 11 acquires the vehicle information on the host vehicle (hereinafter also referred to as "host vehicle information") using various sensors, such as a gyro sensor, an acceleration sensor, and a geomagnetic sensor mounted on the host vehicle, and a Global Positioning System (GPS) receiver. The host vehicle information includes the information on the position, speed, acceleration, and direction, etc. of the host vehicle.

The vehicle-to-vehicle communication unit 12 carries out bidirectional wireless communication with other vehicles and receives the vehicle information on the other vehicles (hereinafter also referred to as "other vehicle information"). The other vehicle information includes the information on the position, speed, acceleration, and direction, etc. of the other vehicles.

It should be noted that, though other vehicles are vehicles other than the host vehicle, other vehicles in this embodiment mainly refer to the vehicles traveling on a road that intersects with the host-vehicle traveling road at an intersection toward which the host vehicle is traveling. It should also be noted that the distance between other vehicles in this embodiment means the distance between two other vehicles that satisfy the condition described above and that are consecutive without an intervening vehicle.

The disabled vehicle identification unit 13 calculates the distance between other vehicles using each piece of the other vehicle information (for example, the position information) received from a plurality of other vehicles. The disabled vehicle identification unit 13 determines whether the distance between the other vehicles is equal to or less than a predetermined distance. The predetermined distance may be set considering the distance provided between a towing vehicle and a towed vehicle (disabled vehicle) when towing a disabled vehicle. For example, a distance that is considered as the distance for towing a vehicle is set as the predetermined distance. Noted that the information used for calculating the distance between the other vehicles is not limited to the position information, but the speed information, acceleration information, direction information, etc. may also be used.

When the distance between the other vehicles is equal to or less than the predetermined distance, the disabled vehicle identification unit 13 measures the time during which the state where the distance between the other vehicles is equal to or less than the predetermined distance continues. Then, the disabled vehicle identification unit 13 determines whether the measured time is equal to or more than a predetermined time. The predetermined time is set as follows. That is, when the state where two vehicles are traveling individually continues while maintaining the vehicle-to-vehicle distance of equal to or less than the predetermined distance, the predetermined time can be set to a possible time during which the two vehicles can continue traveling in that state. In other words, the predetermined time can be set to an impossible continuation time of that state when towing is not performed.

If it is determined that the measured time is equal to or more than the predetermined time, the disabled vehicle identification unit 13 identifies that one of the other vehicles for which the determination is made is a disabled vehicle that is being towed. Note that the disabled vehicle identification unit 13 assigns an ID to each of the other vehicles to identify a plurality of other vehicles and combines the IDs to manage the information on a combination of other vehicles.

Figure 2:
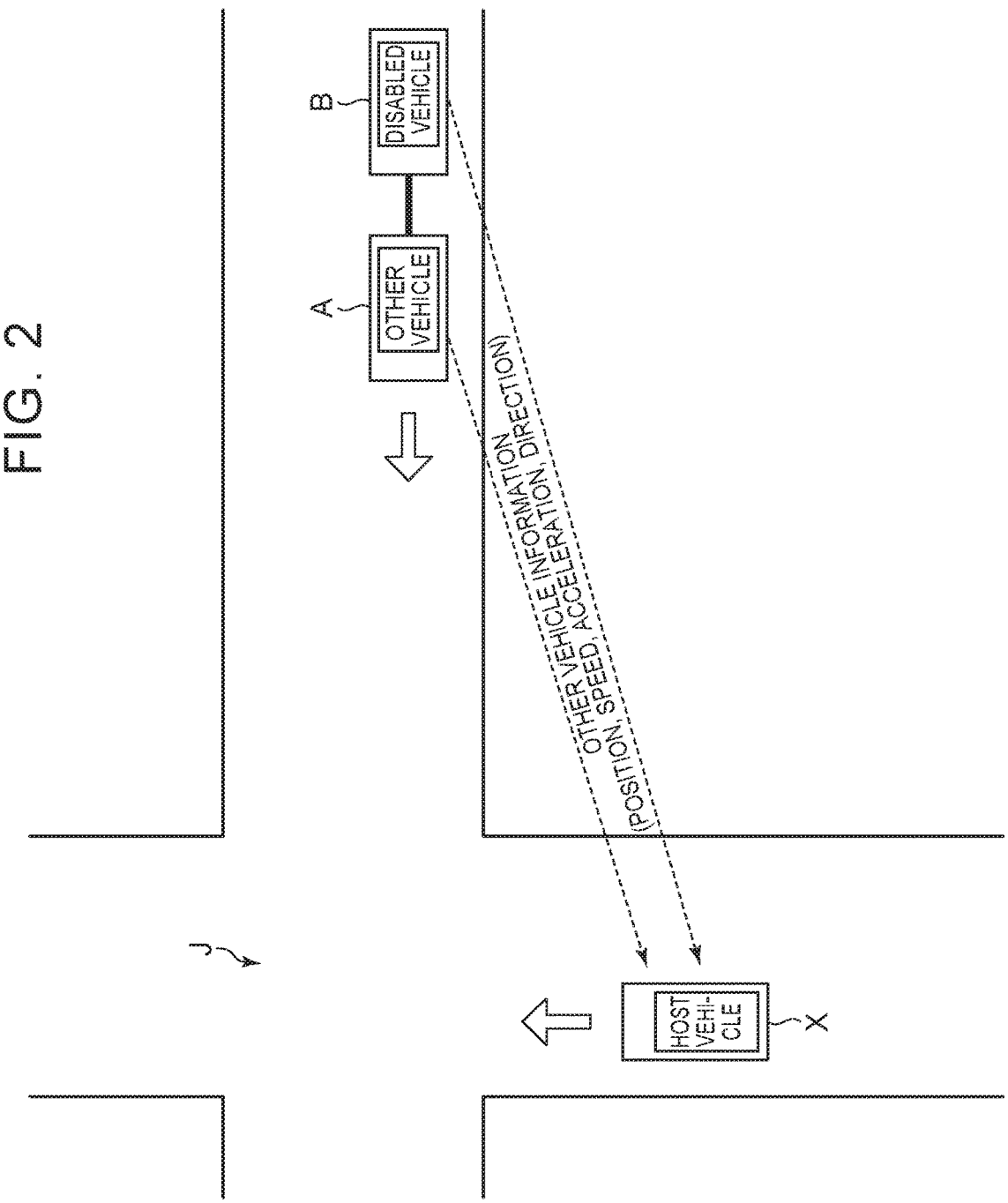
FIG. 2 is a schematic diagram showing a situation in which a disabled vehicle is identified from a plurality of other vehicles approaching an intersection.

With reference to FIG. 2, how a disabled vehicle is identified from a plurality of other vehicles that are approaching an intersection will be described below. FIG. 2 shows that the host vehicle X is traveling toward the intersection J and that the two vehicles, one is another vehicle A and the other is a still another vehicle B (disabled vehicle) towed by the another vehicle A, are traveling toward the same intersection J from a road different from the host vehicle X traveling road.

In this case, based on the other vehicle information received from the other vehicles A and B, the disabled vehicle identification unit 13 of the host vehicle X determines that the state where the distance between the other vehicles is equal to or less than the predetermined distance has continued for the predetermined time or longer. As a result, the disabled vehicle identification unit 13 determines that the other vehicle B, which is one of the other vehicles A and B and is traveling at a position further away from the intersection J, is a disabled vehicle. It is also possible to determine the direction in which the other vehicles A and B are traveling and, based on the determined direction, to identify one of the other vehicles located further behind as a disabled vehicle.

Now, the description returns to FIG. 1. If it is determined by the disabled vehicle identification unit 13 that one of the other vehicles is a disabled vehicle that is being towed, the driving assistance control unit 14 shown in FIG. 1 determines that the execution of the assistance provision determination processing, which determines whether to provide driving assistance based on the other vehicle information received from the disabled vehicle, should be suspended. Driving assistance is provided, for example, to give an alert to the state of surrounding vehicles. The state of surrounding vehicles for which an alert is to be output occurs, for example, when there is a vehicle that is approaching the intersection.

In this case, if it is determined that the execution of the assistance provision determination processing based on the other vehicle information received from the disabled vehicle should be suspended, the driving assistance control unit 14 may turn off the driving assistance flag. This allows the driving assistance control unit 14 to refer to the driving assistance flag to determine whether the execution of the assistance provision determination processing based on other vehicle information received from the disabled vehicle is suspended.

If it is determined by the disabled vehicle identification unit 13 that the other vehicle is not a disabled vehicle that is being towed, the driving assistance control unit 14 determines to continue the execution of the assistance provision determination processing, for example, to give an alert to the state of surrounding vehicles. If it is determined to continue the execution of the assistance provision determination processing, the driving assistance control unit 14 turns on the driving assistance flag. After the driving assistance control unit 14 has determined to continue the execution of the assistance provision determination processing, the assistance provision determination processing is further executed. The procedure for further executing the assistance provision determination processing will be described below.

First, the driving assistance control unit 14 calculates the time at which another vehicle will arrive at the intersection toward which both the host vehicle and the other vehicle are traveling, based on the other vehicle information and so on.

Next, the driving assistance control unit 14 determines whether there is a possibility that the host vehicle will collide with the other vehicle at the intersection, based on the host vehicle information, the other vehicle information, and the time at which the other vehicle will arrive at the intersection. To determine the possibility of collision, a known technique such as Time To Collision (TTC) can be used as necessary.

Next, if it is determined that there is a possibility that the host vehicle and the other vehicle will collide at the intersection, the driving assistance control unit 14 determines to provide driving assistance. That is, the driving assistance control unit 14 requests the driving assistance unit 15 to provide driving assistance. On the other hand, if it is determined that there is no possibility that the host vehicle and the other vehicle will collide at the intersection, the driving assistance control unit 14 determines not to provide driving assistance.

When requested by the driving assistance control unit 14 to provide driving assistance, the driving assistance unit 15 provides driving assistance by alerting the driver to the state of the surrounding vehicles. For example, the driving assistance unit 15 may alert the driver by displaying a message on the display to indicate that there is an approaching vehicle or by outputting a voice message from the speaker to indicate that there is an approaching vehicle.

Figure 3:
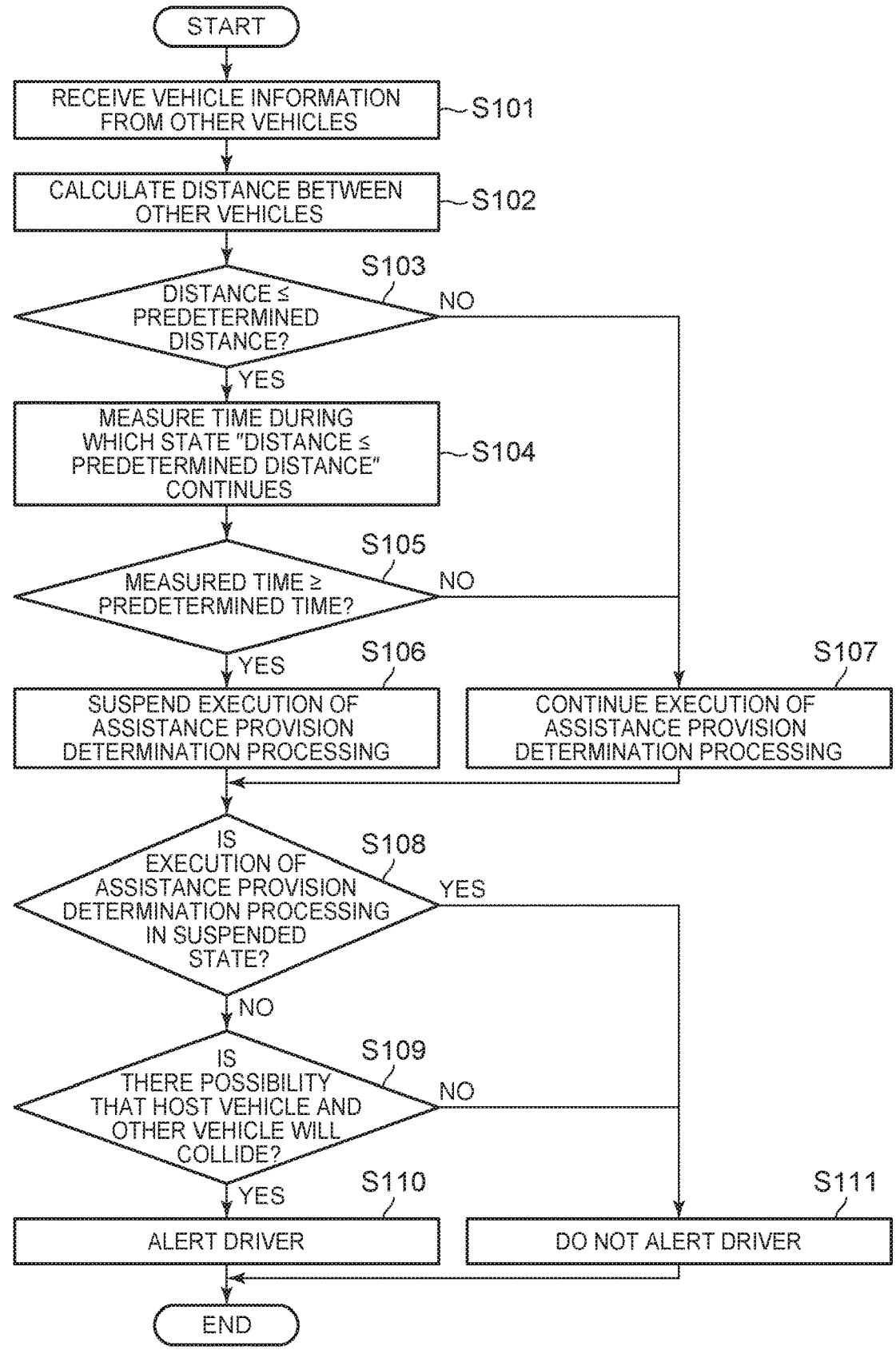
FIG. 3 is a flowchart showing an example of the operation of the driving assistance system shown in FIG. 1.

Next, with reference to FIG. 3, an example of the operation of the driving assistance system that includes the driving assistance device according to the embodiment will be described.

First, the vehicle-to-vehicle communication unit 12 receives the other vehicle information sent from other vehicles (step S101).

Next, the disabled vehicle identification unit 13 calculates the distance between the other vehicles by using the other vehicle information received from the plurality of other vehicles (step S102).

Next, the disabled vehicle identification unit 13 determines whether the distance between the other vehicles calculated in step S102 is equal to or less than a predetermined distance (step S103). If the result of this determination is NO (step S103; NO), the driving assistance control unit 14 determines to continue the execution of the assistance provision determination processing for alerting the driver to the state of the surrounding vehicles (step S107). After that, the processing proceeds to step S108.

If it is determined in step S103 described above that the distance between the other vehicles is equal to or less than the predetermined distance (step S103; YES), the disabled vehicle identification unit 13 measures the time during which the state where the distance between the other vehicles is equal to or less than the predetermined distance continues (step S104).

Next, the disabled vehicle identification unit 13 determines whether the time measured in the step S104 described above is a predetermined time or more (step S105). If the result of this determination is NO (step S105; NO), the driving assistance control unit 14 determines to continue the execution of the assistance provision determination processing for alerting the driver to the state of the surrounding vehicles (step S107). After that, the processing proceeds to step S108.

If it is determined in step S105 described above that the measured time is equal to or more than the predetermined time (step S105; YES), the disabled vehicle identification unit 13 identifies that the other vehicle for which the determination is made is a disabled vehicle that is being towed. In this case, the driving assistance control unit 14 determines that the execution of the assistance provision determination processing based on other vehicle information received from the disabled vehicle should be suspended (step S106).

Next, the driving assistance control unit 14 determines whether the execution of the assistance provision determination processing is in the suspended state (step S108). If the result of this determination is YES (step S108; YES), the driving assistance unit 15 does not alert the driver (step S111), that is, does not provide driving assistance. After that, the operation is terminated.

If it is determined in step S108 described above that the execution of the assistance provision determination processing is not in the suspended state (step S108; NO), the driving assistance control unit 14 determines whether there is a possibility that the host vehicle and the other vehicle will collide at the intersection (step S109). If the result of this determination is NO (step S109; NO), the driving assistance unit 15 does alert the driver (step S111), that is, does not provide driving assistance. After that, the operation is terminated.

If it is determined in step S109 described above that there is a possibility that the host vehicle and the other vehicle will collide at the intersection (step S109; YES), the driving assistance unit 15 alerts the driver (step S110), that is, provides driving assistance. After that, the operation is terminated.

As described above, based on the information about the positions of the vehicles corresponding to the other vehicle information received from a plurality of other vehicles that are approaching an intersection, the driving assistance system 1 in the embodiment determines whether the state where the distance between the other vehicles is equal to or less than a predetermined distance has continued for a predetermined time or more. If the state where the distance between the other vehicles is a predetermined distance or less has continued for a predetermined time or more, the driving assistance system 1 can determine that one of the other vehicles that is approaching the intersection and is located behind is a disabled vehicle that is being towed. If it is determined in this way that the other vehicle is a disabled vehicle, the driving assistance system 1 can suspend driving assistance based on the other vehicle information received from the disabled vehicle.

That is, the driving assistance system 1 in the embodiment determines whether the vehicle towing condition is satisfied, based on the traveling positions of a plurality of other vehicles. If the vehicle towing condition is satisfied, the driving assistance system 1 can identify that one of the other vehicles located behind is a disabled vehicle that is being towed. Therefore, the driving assistance system 1 in the embodiment can improve accuracy in determining whether the vehicle is a disabled vehicle.

[Modifications] The present disclosure is not limited to the above-described embodiment but can be implemented in various other forms without departing from the spirit of the present disclosure. Therefore, the above-described embodiment is only illustrative in all respects and is not to be construed as limiting. For example, the order of the processing steps described above may be arbitrarily changed, or some of the processing steps may be executed in parallel, as long as there is no inconsistency in the processing contents.

In the embodiment described above, if the state where the distance between the other vehicles is equal to or less than the predetermined distance continues for the predetermined time or more, the disabled vehicle identification unit 13 identifies that one of the other vehicles for which the determination is made is a disabled vehicle that is being towed. However, the condition for identifying that one of the other vehicles is a disabled vehicle is not limited to the condition described above.

For example, if the state where the speed difference between the other vehicles is equal to or less than a predetermined speed continues for a predetermined time or more, the disabled vehicle identification unit 13 may identify that one of the other vehicles for which the determination is made is a disabled vehicle that is being towed. In this case, the predetermined speed may be set to a value in consideration of the speed difference that occurs between the towing vehicle and the towed vehicle (disabled vehicle) when the disabled vehicle is towed. For example, a speed difference that is considered as a speed difference that occurs when one vehicle tows another vehicle is set as the predetermined speed. The predetermined time is set as follows. That is, when the state where two vehicles are traveling individually continues while maintaining the predetermined speed difference, the predetermined time can be set to a possible time during which the two vehicles can continue traveling in that state. In other words, the predetermined time can be set to an impossible continuation time of that state when towing is not performed.

In addition, if it is determined that the other vehicle information received from one of the other vehicles includes the information indicating that the vehicle is disabled, the disabled vehicle identification unit 13 may identify that the other vehicle is a disabled vehicle.

In the embodiment described above, when it is identified that one of the other vehicles is a disabled vehicle, the driving assistance control unit 14 suspends the execution of the assistance provision determination processing that is based on the vehicle information received from the disabled vehicle. However, the processing that can be performed when the other vehicle is a disabled vehicle is not limited to this processing. That is, when the other vehicle is identified as a disabled vehicle, it is only required to change at least one of the two, one is the driving assistance providing condition and the other is the driving assistance providing method, both of which are based on the other vehicle information received from the disabled vehicle.

For example, one way to change the driving assistance providing condition that is based on the other vehicle information received from a disabled vehicle is that, when one of the other vehicles is identified as a disabled vehicle, the threshold value for determining the possibility of collision is changed and, thereby, the condition for determining whether to provide driving assistance via an alert is changed.

Similarly, one way to change the driving assistance providing method that is based on the other vehicle information received from a disabled vehicle is that, when one of the other vehicles is identified as a disabled vehicle, an alert to the state of the surrounding vehicles is output and, at the same time, a notification is output to notify that the approaching vehicle is a disabled vehicle to further alert the driver.

What is claimed is:

1. A driving assistance device comprising:
   a communication device configured to receive non-host vehicle information from a towing vehicle and a towed vehicle;
   first processor configured to identify that the towed vehicle is a disabled vehicle if it is determined, using the non-host vehicle information, that a distance between the towing vehicle and the towed vehicle is equal to or less than a predetermined distance for a predetermined time or more; and
   a second processor configured to, in response to the determination that the towed vehicle is the disabled vehicle, change at least one of a driving assistance providing condition and a driving assistance providing method both of which are based on the non-host vehicle information received from the towed vehicle.

2. The driving assistance device according to claim 1, wherein the first processor is further configured to identify that the towed vehicle is the disabled vehicle if it is determined that a speed difference between the towing vehicle and the towed vehicle is equal to or less than a predetermined speed for a predetermined time or more.

3. The driving assistance device according to claim 1, wherein the first processor is further configured to identify that the towed vehicle is the disabled vehicle if it is determined that information indicating that the towed vehicle is a disabled vehicle is included in the non-host vehicle information.

4. A method controlled by a driving assistance device comprising:
   receiving non-host vehicle information from a towing vehicle and a towed vehicle;
   identifying that a towed vehicle is a disabled vehicle if it is determined, using the non-host vehicle information, that a distance between the towing vehicle and the towed vehicle is equal to or less than a predetermined distance for a predetermined time or more; and
   if it is determined that the towed vehicle is the disabled vehicle, changing at least one of a driving assistance providing condition and a driving assistance providing method both of which are based on the non-host vehicle information received from the towed vehicle.

* * * * *